(12) United States Patent
Küke (10) Patent No.: US 9,827,542 B2
(45) Date of Patent: Nov. 28, 2017

(54) DEVICE AND METHOD FOR PRODUCING AQUEOUS CHLORINE DIOXIDE SOLUTIONS, AND STORAGE UNITS AND KITS FOR CORRESPONDING USAGE

(71) Applicant: Fritz Küke, Isernhagen (DE)

(72) Inventor: Fritz Küke, Isernhagen (DE)

(*) Notice: Subject to any disclaimer, the term of this patent is extended or adjusted under 35 U.S.C. 154(b) by 279 days.

(21) Appl. No.: 14/398,674

(22) PCT Filed: May 6, 2013

(86) PCT No.: PCT/EP2013/059337
§ 371 (c)(1),
(2) Date: Nov. 3, 2014

(87) PCT Pub. No.: WO2013/164486
PCT Pub. Date: Nov. 7, 2013

(65) Prior Publication Data
US 2015/0125382 A1     May 7, 2015

(30) Foreign Application Priority Data
May 4, 2012   (DE) .......................... 10 2012 207 472

(51) Int. Cl.
*B01J 4/00*     (2006.01)
*B01J 19/24*    (2006.01)
(Continued)

(52) U.S. Cl.
CPC ........... *B01J 4/001* (2013.01); *B01J 19/0006* (2013.01); *B01J 19/24* (2013.01); *C01B 11/024* (2013.01);
(Continued)

(58) Field of Classification Search
CPC ..... B01J 4/001; B01J 4/008; B01J 7/02; B01J 19/24; B01J 19/2405; B01J 2204/002;
(Continued)

(56) References Cited

U.S. PATENT DOCUMENTS

| | | | | |
|---|---|---|---|---|
| 2,234,499 A | * | 3/1941 | McAllister | G01N 30/62 422/86 |
| 3,442,778 A | | 5/1969 | Westerlund | |
| 2008/0292507 A1 | * | 11/2008 | Dee | B01J 7/02 422/110 |

FOREIGN PATENT DOCUMENTS

| | | | |
|---|---|---|---|
| CA | 2822508 | * | 6/2012 |
| DE | 19518464 | | 11/1996 |

(Continued)

*Primary Examiner* — Lessanework Seifu
(74) *Attorney, Agent, or Firm* — Duane Morris LLP; J. Rodman Steele, Jr.; Gregory M. Lefkowitz (57) ABSTRACT

An apparatus for preparing aqueous chlorine dioxide solutions is described, comprising (a) a reactor (1), (b) a first reservoir unit (8) comprising a first reactant for preparation of chlorine dioxide, the first reactant being in solid form, having an inlet (15) for water and a separate outlet (21), the first reservoir unit (8) being exchangeable, (c) a second reservoir unit (4) for storing a second reactant for preparation of chlorine dioxide. Additionally described are an exchangeable reservoir unit for such an apparatus, a kit comprising or consisting of one or more exchangeable reservoir units and a process for preparing a chlorine dioxide-containing solution usable directly for water treatment.

16 Claims, 5 Drawing Sheets

(51) Int. Cl.
*C01B 11/02* (2006.01)
*B01J 19/00* (2006.01)
(52) U.S. Cl.
CPC ............... *B01J 2219/00051* (2013.01); *B01J 2219/00164* (2013.01)
(58) Field of Classification Search
CPC .. B01J 2219/00051; B01J 2219/000164; B01J 2219/00186; C01B 11/024; C01B 11/026
See application file for complete search history.

(56) References Cited

FOREIGN PATENT DOCUMENTS

| | | |
|---|---|---|
| DE | 102010011699 | 9/2011 |
| EP | 231862 | 8/1987 |
| EP | 822920 | 2/1998 |
| EP | 1494967 | 1/2005 |
| WO | 03/055797 | 7/2003 |
| WO | 2012/084247 | 6/2012 |

* cited by examiner

DEVICE AND METHOD FOR PRODUCING AQUEOUS CHLORINE DIOXIDE SOLUTIONS, AND STORAGE UNITS AND KITS FOR CORRESPONDING USAGE

CROSS-REFERENCE TO RELATED APPLICATIONS

This application is a §371 national stage entry of International Application No. PCT/EP2013/059337, filed May 6, 2013, which claims priority to German Patent Application No. 10 2012 207 472.4, filed May 4, 2012, the entire contents of which are incorporated herein by reference.

The present invention relates to an apparatus for preparing aqueous chlorine dioxide solutions, to an exchangeable reservoir unit for such an apparatus, to a kit comprising or consisting of one or more exchangeable reservoir units and to a process for preparing a chlorine dioxide-containing solution usable directly for water treatment.

Processes for preparing aqueous chlorine dioxide solutions are known from the prior art.

For example, European patent specification EP 0 822 920 B1 relates to a process for preparing a chlorine dioxide-containing disinfection solution for water treatment. The patent specification itself refers in turn to a number of publications from the prior art relating to the production of chlorine dioxide.

The process according to EP 0 822 920 B1 is nowadays known in general as the peroxodisulfate-chlorite process and has been covered, for example, in the DVGW-Regelwerk Arbeitsblatt W 224 [Standards of the German Technical and Scientific Association for Gas and Water, Technical Bulletin W 224] (in the February 2010 edition, cf. point 6.4, where the process is referred to as the chlorite/peroxodisulfate process).

The peroxodisulfate-chlorite process has also been covered in ÖNORM [Austrian Standard] M5879-3 (2010-11-01 edition), Teil 3: Chlordioxid-Anlagen [Part 3: Chlorine dioxide plants]. Annex A of ÖNORM M5879-3 in the edition dated 1 Nov. 2010 relates to the "configuration of the chlorine dioxide production plants by the chlorite-sodium peroxodisulfate process" and also shows a schematic diagram of a "plant with a reactor for single use". It is assumed that the two reactants, sodium peroxodisulfate and sodium chlorite, are each provided in aqueous solution and separately from one another.

A two-component system for production of chlorine dioxide solutions consisting of sodium chlorite solution and sodium peroxodisulfate is also already known from DVGW-Arbeitsblatt W 291 (in the addition of March 2010; cf. point 5.3.5 therein). According to this standard, sodium peroxodisulfate is used as salt.

Alternative processes for preparing chlorine dioxide are not based on the combination of peroxodisulfate and chlorite. For example, patent specification EP 1 494 967 B1 discloses a process for preparing chlorine dioxide in a mixture with oxygen by reaction of chlorite with peroxomonosulfate in the presence of peroxodisulfate as redox initiator in acidic aqueous solution.

ÖNORM M5879-03: 2010, which has already been cited above, discloses a number of chlorine dioxide production plants; cf. point 6 therein. In particular, there is disclosure of plants for the chlorite-chlorine gas process and the chlorite-acid process.

DVGW-Arbeitsblatt W 224 discloses, as well as the chlorite/peroxodisulfate process already mentioned, the chlorite/chlorine process and the chlorite/hydrochloric acid process.

European Standard EN12671 also discloses the peroxodisulfate-chlorite process.

DVGW-Merkblatt W 624 from October 1996 discloses chlorine dioxide plants by the chlorite/chlorine process and by the chlorite/acid process.

The preparation of chlorine dioxide gives rise to a product having a high endangerment potential from reactants which should themselves be regarded as hazardous. Consequently, there is a constant need for improvements in the processes and plants known for the preparation of chlorine dioxide toward the best possible user safety. If aqueous chlorine dioxide solutions are prepared manually, it is necessary to use trained personnel who carefully prepare the particular reaction solution from reactant solutions, especially ones which have been prepared beforehand.

ÖNORM M5879-3: 2010 already discloses, in Annex A, a chlorine dioxide production plant by the chlorite-sodium peroxodisulfate process, wherein the starting materials are a liquid sodium peroxodisulfate solution and a sodium chlorite solution. The automated process configuration is certainly safer compared to manual preparation, but it is associated with the disadvantage that solutions of sodium peroxodisulfate, especially at low pH values, as present after the dissolution of sodium peroxodisulfate in water, break down again comparatively quickly. This rapid breakdown of acidic aqueous solutions of sodium peroxodisulfate was confirmed by studies at the Philipps University of Marburg, Chemistry Department, Professor Dr. Andreas Seubert. Storage of acidic sodium peroxodisulfate solutions for sufficiently long periods without breakdown of the sodium peroxodisulfate is therefore impossible. A significant increase in storage stability of sodium peroxodisulfate solutions can be achieved by setting pH values >6; however, for performance of the peroxodisulfate-chlorite process, when a pH >6 is set in the sodium peroxodisulfate solution, additional amounts of acid have to be used for preparation of the reaction solution, since the chlorite solution to be used is itself highly alkalized (pH >11) to keep it storage-stable. In other words, a stable sodium peroxodisulfate solution can be established (pH >6), but this in practice forces the provision of a third component (acid) if the sodium peroxodisulfate-chlorite process is to be conducted.

In practice, there are also isolated uses of solids in the preparation of chlorine dioxide solutions, but in that case they are metered manually into a water reservoir; cf., for example, the process according to EP 1 494 967 B1. It is considered to be disadvantageous in this regard that the user can come into contact with the reactant(s) in solid form in the case of manual metering, which can be disadvantageous to health, and can also be exposed to the toxic chlorine dioxide gas through spontaneous formation of chlorine dioxide in such an open system.

It is a primary object of the present invention to specify an apparatus for preparation of aqueous chlorine dioxide solutions, which reduces the risk to the user in preparation of the chlorine dioxide solution and preferably simplifies the preparation in doing so. Accordingly, a safer and preferably simpler process for preparing chlorine dioxide was to be specified.

According to the invention, in a first aspect of the present invention, the primary object stated is achieved by an apparatus for preparing aqueous chlorine dioxide solutions, comprising (a) a reactor,
(b) a first reservoir unit,
comprising a first reactant for preparation of chlorine dioxide, the first reactant being in solid form,
having an inlet for water and a separate outlet,
the first reservoir unit being exchangeable,
(c) a second reservoir unit for storing a second reactant for preparation of chlorine dioxide.

Accordingly, the present invention also relates to an exchangeable reservoir unit for an inventive apparatus, comprising a first reactant for preparation of chlorine dioxide having an inlet for water and a separate outlet, the first reactant being in solid form.

The present invention is based on the surprising finding that aqueous chlorine dioxide solution can be prepared in a safe and simple manner if a suitable first reactant is in solid form and is provided in a (first) reservoir unit having a water inlet and a separate outlet, and is exchangeable within the overall apparatus. In the peroxodisulfate-chlorite process, the peroxodisulfate in particular is a suitable first reactant which may be in solid form in an inventive apparatus. It has already been stated above that aqueous solutions of peroxodisulfate are unstable at low pH but, on the other hand, the use of alkalized aqueous solutions of peroxodisulfate entails the use of acid as a third component. This disadvantage of the use of aqueous peroxodisulfate solution has been overcome if solid peroxodisulfate is provided in the first reservoir unit in an inventive apparatus. Alternatively, however, it is also quite possible to provide the chlorite component of a peroxodisulfate-chlorite system as the first reactant in the solid state. In the specific case—as is similarly also the case when peroxodisulfate is used as the first solid reactant—this is associated with advantages in the metering of the reactants. Moreover, in this respect too, user contact with a reactant that presents a health hazard is avoided.

An inventive apparatus (preferably an inventive apparatus as identified above as "preferred") is preferably suitable for preparation of aqueous chlorine dioxide solutions usable directly for water treatment, preferably by the peroxodisulfate-chlorite process, the sodium chlorite-hydrochloric acid process, the chlorine solution: chlorite solution process (for chemism see: White, G. C.; Handbook of Chlorination and alternative Disinfectants; John Wiley & Sons, Inc., Weinheim, 1999; p. 1162) or the sodium chlorite solution-sulfuric acid process (for chemism see: Böhmländer, F.; Entwicklung von Chlordioxyd aus Natriumchlorit-Lösung mit Hilfe von Schwefelsäure [Evolution of chlorine dioxide from sodium chlorite solution with the aid of sulfuric acid]; from Wasser 29 (78) 1962, p. 78-97). The apparatus is of very particular suitability for preparation of aqueous chlorine dioxide solutions usable directly for water treatment by the peroxodisulfate-chlorite process and the sodium chlorite-hydrochloric acid process.

Alternatively, an inventive apparatus is also suitable for other processes in which two or more reactants for preparation of chlorine dioxide are contacted with one another. For example, the inventive apparatus can be employed in the chlorite-sulfuric acid process or chlorite-hydrogensulfate process, in which case the chlorite reactant is provided in the solid form of the sodium, potassium, ammonium, calcium or magnesium salt in the first reservoir unit.

Preferably, an inventive apparatus (preferably an inventive apparatus identified above as "preferred") comprises, as well as the elements specified above, also
(d) a feed connected liquid-tight to an inlet for water, for connection of the first reservoir unit to a water reservoir.

In this configuration, the first reservoir unit of an inventive apparatus is preferably connected via a standard feed to a water reservoir, the water reservoir in practice being a standard public or in-house water grid. From this public water grid or another water reservoir, in operation, water is passed into the first reservoir unit, such that the first reactant originally in solid form is fully or partly dissolved. The fully or partly dissolved first reactant is then fed to the reactor, where it is combined with the second reactant.

An inventive apparatus comprising, as constituent (d), a feed connected liquid-tight to the inlet for water, for connection of the first reservoir unit to a water reservoir, preferably additionally comprises
(e) a device for heating and/or cooling water, the relationship of the device to said feed being such that
water heated or cooled by the device is fed via the feed to the first reservoir unit
and/or
water is fed via the feed to the device.

It has been found that the temperature of the water in the water reservoir (for example a public water grid) corresponds only in rare cases to the temperature desired for rapid and reliable dissolution of the first reactant. For this reason, it is advantageous in a multitude of cases to provide a device for heating and/or cooling the water which comes into contact with the first reactant in the first reservoir unit and is intended to dissolve it. In operation, the user will operate the device such that the heated or cooled water has an optimal temperature for the process configuration on entry into the first reservoir unit.

The device for heating and/or cooling water is preferably a thermostat. In practice, heating is frequently more important than cooling, especially in the peroxodisulfate-chlorite process, where a temperature of >30° C. is frequently to be established for dissolution of the peroxodisulfate salt. A preferred device for heating and/or cooling water therefore comprises a heating element. More preferably, the device comprises both a heating element and a cooling element.

Preferably, an inventive device (preferably a benefit-identified device) additionally comprises
(f) means for transferring liquid from the first reservoir unit into the reactor and/or
(g) means for transferring liquid from the second reservoir unit into the reactor.

It has already been stated above that water is transported into the first reservoir unit via the feed mentioned at that point, in order to fully or partly dissolve the first reactant therein, so that it can subsequently be transferred into the reactor. Accordingly, an inventive apparatus therefore preferably comprises means for transferring liquid from the first reservoir unit into the reactor. In many cases, it is preferable in this respect when the apparatus comprises one or more pipelines through which the first reservoir unit is connected to the reactor. Such a configuration is merely preferable, but is not absolutely necessary for achievement of the purposes of the present invention. Alternatively, for example, the outlet of the first reservoir unit may be arranged above the reactor such that exiting liquid (thus, in practice, an aqueous solution of the first reactant just dissolved) falls freely into the reactor.

For the means provided with preference for transferring liquid from the second reservoir unit to the reactor, the statements made above apply correspondingly.

Preferably, an inventive apparatus comprises both (f) means for transferring liquid from the first reservoir unit into the reactor and (g) means for transferring liquid from the second reservoir unit into the reactor. It is especially preferable here when the respective means each comprise one or more pipelines.

An inventive apparatus (preferably an apparatus identified above as preferred) which is particularly preferred in practice additionally comprises (h) a reservoir vessel for accommodating aqueous chlorine dioxide solution from the reactor, the reservoir vessel preferably being disposed beneath the reactor such that aqueous chlorine dioxide solution can be transferred by means of gravity from the reactor to the reservoir vessel.

Preferably, as well as the reactor itself, in which an aqueous chlorine dioxide solution has indeed formed after complete conversion of the reactants, a separate reservoir vessel for accommodating aqueous chlorine dioxide solution is thus provided. This enables the user firstly to transport aqueous chlorine dioxide solution from the reservoir vessel to where it is required for the particular disinfection tasks, and simultaneously to prepare fresh aqueous chlorine dioxide solution in the reactor. The preferred arrangement of the reservoir vessel beneath the reactor enables the particularly simple and safe transfer of the aqueous chlorine dioxide solution from the reactor into the reservoir vessel. For this purpose, no pumps or the like are required, and so there are also reduced maintenance costs as well as reduced acquisition costs.

The reservoir vessel preferably has an interior somewhat larger than the interior of the reactor. This allows the entire volume of aqueous chlorine dioxide solution produced in the reactor to be transferred to the reservoir vessel if the reservoir vessel is empty or is filled with no more than a (reserve) stock of chlorine dioxide solution which, on the one hand, is sufficient to provide chlorine dioxide solution for a sufficiently long period but, on the other hand, is sufficiently small that the remaining internal volume of the reservoir vessel can accommodate the entire volume of chlorine dioxide solution from the reactor.

The inventive apparatus is preferably suitable for performance of the peroxodisulfate-chlorite process, for which purpose it is advantageously configured as described above as preferred.

Preferably, the first reactant in the first reservoir unit is peroxodisulfate, and the ratio of the molar amount of peroxodisulfate in the first reservoir unit to the volume of the reactor is less than or equal to 0.148 mol/L, more preferably in the range from 0.00148 mmol/L to 0.037 mol/L.

Alternatively, the first reactant in the first reservoir unit is chlorite and the ratio of the molar amount of chlorite in the first reservoir unit to the volume of the reactor is preferably less than or equal to 0.296 mol/L and more preferably in the range from 0.00296 mmol/L to 0.074 mol/L.

The aforementioned ratios of the molar amount of first reactant to the volume of the reactor are in both alternative cases selected such that the first reservoir unit does not comprise more first reactant than required for preparation of a maximum concentration of 20 g of chlorine dioxide/L of reactor volume. The preferred value specified in each case for said ratio is chosen such that not more than 20 g of chlorine dioxide/L of reactor volume can be produced. The particularly preferred range specified in each case for the ratio of the molar amount of first reactant to the volume of the reactor is selected in each case such that the maximum resulting amount of chlorine dioxide in the reactor is between 0.2 mg/L and 5 g/L. The value of 20 g/L corresponds to a value at which any risk of explosion of the reactor contents is substantially ruled out with exclusion of air. The value of 0.2 mg/L corresponds to the maximum concentration of chlorine dioxide in drinking water according to drinking water regulations, or the required concentration of chlorine dioxide for killing microbes that occur in drinking water, such as *E. coli*, pseudomonads, *legionella* etc.

Preferably, an inventive apparatus comprising a reservoir vessel additionally comprises (i) a metering device for controlled withdrawal of aqueous chlorine dioxide solution from the reservoir vessel.

The metering device may be configured as known from the prior art; the metering device may thus especially take the form of a metering pump (e.g. membrane metering pump) or of a peristaltic pump or of a proportional metering device or of a water-jet pump exploiting the Venturi effect.

An inventive apparatus preferably additionally comprises (j) a device for heating and/or cooling the reactor, the device preferably comprising an open-loop or closed-loop control unit for setting a target temperature and/or keeping it constant at a target temperature.

It will be appreciated that the reaction between the first reactant and the second reactant for preparation of chlorine dioxide should preferably take place within a defined temperature range that gives the user maximum safety and especially prevents the thermolysis of the chlorine dioxide to other chlorine oxide degradation products or else explosion of the reaction mixture or of the product mixture. According to the conditions in the individual case, in this respect, the reactor should be heated and/or cooled. A particularly high level of safety is assured when the internal reactor temperature is controlled by means of an open-loop or closed-loop control unit preferably set up to establish a target temperature and/or to maintain a constant target temperature.

An inventive apparatus (preferably as identified above as preferred) additionally comprises (k) a barrier apparatus for preventing or hindering liquids and/or gases from passing over from the reactor into the first reservoir unit.

In in-house studies, a disadvantageous finding in some cases has been that gaseous chlorine dioxide or liquid reaction mixture was able to pass from the reactor into the first reservoir unit, counter to the direction of entry of the dissolved first reactant into the reactor. A barrier apparatus may especially be configured as a siphon or non-return valve; other configurations are possible.

It is particularly advantageous to substantially automate an inventive apparatus and, for the purposes of automation, one or more open-loop and/or closed-loop control units are preferable. Preferred inventive apparatuses (especially those as identified above as preferred) additionally comprise, as well as the abovementioned constituents, (l) an open-loop and closed-loop control unit for controlling
the water flow to the first reservoir unit
and/or
the device for heating and/or cooling water, which device is related to said feed to the first reservoir unit
and/or
the device for heating and/or cooling the reactor
and/or
the liquid volume to be transferred from the second reservoir unit to the reactor
and/or
the volume of aqueous chlorine dioxide solution to be transferred from the reactor to the reservoir vessel
and/or
the metering device for metered withdrawal of aqueous chlorine dioxide solution from the reservoir vessel.

It is of course particularly preferable when the additionally provided open-loop and closed-loop control unit assumes all the aforementioned control tasks. However, it may be quite advantageous in the individual case to provide one open-loop and closed-loop control unit which assumes only one, two, three or more of said tasks.

In practice, an inventive apparatus (as defined above, preferably as identified above as preferred) encompasses not just the first reactant in the first reservoir unit but also the second reactant in the second reservoir unit. In many cases, it is advantageous when the second reactant in the second reservoir unit is in the form of a liquid solution, preferably in the form of an aqueous solution. For example, it is advantageous when the first reactant in the first reservoir unit is peroxodisulfate in solid form and the second reactant in the second reservoir unit is an aqueous chlorite solution, such that the inventive apparatus in this case is prepared for performance of the peroxodisulfate-chlorite process.

Alternatively, it is preferable when the first reactant in the first reservoir unit is chlorite in solid form and the second reactant in the second reservoir unit is an aqueous peroxodisulfate solution.

As a further alternative, it is preferable when the first reactant in the first reservoir unit is chlorite in solid form and the second reactant in the second reservoir unit is hydrochloric acid or another acid for performance of the chlorite-acid process.

As a further alternative, it is preferable when the first reactant in the first reservoir unit is a chlorite/hypochlorite salt mixture in solid form and the second reactant in the second reservoir unit is hydrochloric acid or another acid, especially for performance of the chlorine solution: chlorite solution process.

As a further alternative, it is preferable when the first reactant in the first reservoir unit is a chlorite in solid form and the second reactant in the second reservoir unit is sulfuric acid or another acid or a hydrogensulfate or another acidic salt in solid form, especially for performance of the sodium chlorite solution-sulfuric acid process.

As an alternative to this, it is preferable when the first reactant in the first reservoir unit is a hydrogensulfate or another acidic salt in solid form and the second reactant in the second reservoir unit is an aqueous chlorite solution or a solid chlorite, especially for performance of the sodium chlorite solution-sulfuric acid process.

As a further alternative, it is preferable when the first reactant in the first reservoir unit is a peroxomonosulfate and/or another persulfate—including as a redox initiator—in solid form and the second reactant in the second reservoir unit is an aqueous chlorite solution or a solid chlorite, especially for performance of the chlorite-peroxodisulfate process according to DVGW Arbeitsblatt W224.

Preferably, the second reservoir unit is arranged above the reactor such that a or the aqueous solution of the second reactant can be transferred from the second reservoir unit by means of gravity into the reactor. This is preferably especially true when the second reservoir unit already comprises the second reactant, preferably in the form of a liquid solution, more preferably in the form of an aqueous solution.

It will be appreciated that such a configuration of an inventive apparatus, in which the second reservoir unit is arranged above the reactor such that aqueous solution of the second reactant can be transferred from the second reservoir unit by means of gravity into the reactor, is advantageous especially when a reservoir vessel for accommodating aqueous chlorine dioxide solution from the reactor, arranged beneath the reactor, is additionally provided, such that aqueous chlorine dioxide solution can be transferred by means of gravity from the reactor into the reservoir vessel. In the case of such a configuration, the second reactant can pass into the reactor by means of gravity, and aqueous chlorine dioxide solution produced therein can in turn pass by means of gravity into the reservoir vessel. Pumps or the like are not required for either of the transport steps.

In some cases, it is beneficial to configure the inventive apparatus such that the second reservoir unit already comprises the second reactant and has an inlet for water and a separate outlet, in a quite similar manner to that detailed above for the first reservoir unit. In such cases, the second reservoir unit is preferably exchangeable, and the second reactant in the second reservoir unit is then preferably also in solid form. In such particularly preferred configurations of an inventive apparatus, both the first and second reactants are in solid form, each of the two reactants is provided in a first or second reservoir unit, and both the first reservoir unit and the second reservoir unit are exchangeable. Such a configuration is advantageous especially in an apparatus provided for performance of the peroxodisulfate-chlorite process; such an apparatus preferably comprises both the peroxodisulfate component in solid form and the chlorite component in solid form, each of the two components being provided in a (first or second) reservoir unit. For the second reservoir unit, in such cases, all the remarks relating to preferred configurations of the first reservoir unit apply correspondingly. More particularly, all the remarks relating to the connection of the first reservoir unit to a water reservoir and to the reactor apply correspondingly. Reference is therefore made to the above remarks.

Particularly preferred inventive apparatuses comprise a first magazine for accommodating one, two or more replacement reservoir units for the first reservoir unit.

The inventive apparatus comprises a first reservoir unit which is exchangeable and comprises a first reactant. In operation, this first reservoir unit is generally purged by water such that the first reactant goes fully or partly into solution and is removed completely from the first reservoir unit. The corresponding solution or mixture is transported into the reactor, where the reaction to form chlorine dioxide takes place. At this early stage, it is possible to exchange the first reservoir unit for a replacement reservoir unit. The first reservoir unit which has now been emptied is removed from the apparatus and a fresh reservoir unit filled with unused first reactant is inserted into the apparatus in its place. The replacement reservoir unit to be used, given appropriate configuration of the inventive apparatus, can be taken by the user from an appropriate magazine comprising at least one, but preferably two or more, replacement reservoir unit(s). The first reservoir unit is preferably provided with quick-fit pipe connections on the inlet and/or outlet side, which enable rapid exchange and a liquid-tight connection with inlet and/or outlet.

The above remarks relate to the first reservoir unit, but apply correspondingly to the second reservoir unit. Particular preference is therefore given to the presence of a second magazine for accommodating one, two or more replacement reservoir units for the second reservoir unit which is indeed provided in preferred configurations of the inventive apparatus.

It has already been pointed out above that the present invention does not relate merely to an inventive apparatus but also to an inventive exchangeable reservoir unit for such an apparatus. The above remarks relating to preferred inventive apparatuses also apply correspondingly to the inventive exchangeable reservoir unit. More particularly, preference is given to inventive exchangeable reservoir units wherein the first reactant is selected from the group consisting of peroxodisulfate and chlorite. Reference is made to the corresponding remarks above.

The inventive exchangeable reservoir unit defines an interior which accommodates the first reactant and has an inlet for water and a separate outlet. These stipulations lay down the shape of the inventive exchangeable reservoir unit to a substantial degree, but not conclusively. Preference is given to a configuration of the inventive exchangeable reservoir unit wherein the first reactant is disposed in a cylindrical housing, preferably in a cylindrical plastic housing, preferably made of transparent plastic. Plastic is regularly inert toward the solid reactants typically used for preparation of chlorine dioxide, and so any risks to health can be substantially ruled out.

If an inventive exchangeable reservoir unit is not already integrated into an inventive apparatus, it is preferably sealed air- and/or moisture-tight in its entirety, or alternatively at least the interior thereof comprising the first reactant. Preferably, an inventive exchangeable reservoir unit is provided as a replacement reservoir unit, in which case the reservoir unit (as an element of a magazine comprising several replacement reservoir units or as a single replacement reservoir unit) is incorporated in an air- and moisture-tight manner, for example by means of a standard evacuated and welded film.

The present invention also relates to a kit (set of elements) comprising and consisting of one, two or more inventive exchangeable first reservoir units comprising a first reactant for preparation of chlorine dioxide
and additionally
(i) one, two or more second reservoir units comprising a second reactant for preparation of chlorine dioxide
and/or
(ii) a magazine for accommodating the one, two or more exchangeable first reservoir units.

A preferred kit is intended for performance of the peroxodisulfate-chlorite process in an inventive apparatus and comprises one, two or more exchangeable first reservoir units comprising peroxodisulfate as first reactant for preparation of chlorine dioxide, and additionally one, two or more second reservoir units comprising chlorite as second reactant for preparation of chlorine dioxide.

A further particularly preferred kit comprises one, two or more exchangeable first reservoir units comprising peroxodisulfate or chlorite as first reactant for preparation of chlorine dioxide, and additionally a magazine for accommodating said one, two or more exchangeable first reservoir units (each comprising peroxodisulfate or chlorite).

For performance of the peroxodisulfate-chlorite process, very particular preference is given to a kit comprising two magazines, the first magazine comprising two or more exchangeable first reservoir units comprising peroxodisulfate as first reactant, and the second magazine comprising two or more second reservoir units comprising chlorite.

Preferred configurations of an inventive kit are obtained in the case of use of preferred inventive exchangeable reservoir units as defined above. The respective details apply correspondingly.

The present invention also relates to a process for preparing a chlorine dioxide-containing solution usable directly for water treatment, having the following steps:
preparing an aqueous reaction mixture comprising chlorite and peroxodisulfate in a reactor,
the reaction mixture being prepared in the reactor by purging an inventive exchangeable reservoir unit, comprising an amount of a first reactant selected from the group consisting of chlorite and peroxodisulfate, with water so as to result in an aqueous solution of the first reactant which is introduced into the reactor. It will be appreciated that the process according to the invention is preferably performed in an inventive apparatus.

Preferably, in a process according to the invention, the exchangeable reservoir unit comprising the first reactant is purged with water so as to result in an aqueous solution of the entire amount of the first reactant which is introduced into the reactor.

Preferred processes according to the invention are obtained in the case of use of preferred exchangeable reservoir units as defined above. The respective details apply correspondingly. Preferred processes according to the invention are also obtained in the case of use of preferred inventive apparatuses as defined above. In this respect, the respective details above apply correspondingly.

DESCRIPTION OF FIGURES

The invention is elucidated in detail below with reference to the appended figures. The figures show.

Figure 1:
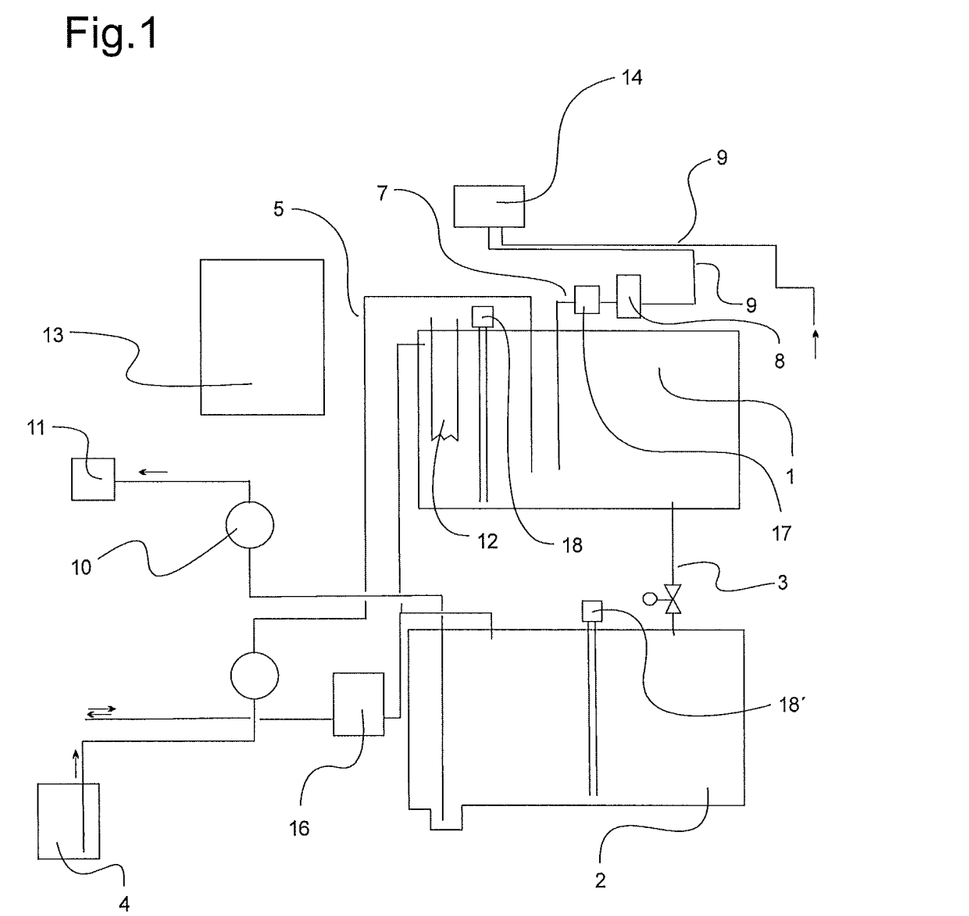
FIG. 1 a schematic diagram of an inventive apparatus (plant) for preparation of aqueous chlorine dioxide solutions.

The apparatus (plant) shown in schematic form in FIG. 1 comprises a reactor 1 in which a reaction mixture is to be converted to an aqueous chlorine dioxide solution. The apparatus additionally comprises a reservoir vessel 2 to accommodate aqueous chlorine dioxide solution from the reactor 1. In the configuration according to FIG. 1, the reservoir vessel 2 is arranged beneath the reactor 1, such that aqueous chlorine dioxide solution (as a product of the reaction conducted in the reactor 1) can be transferred by means of gravity from the reactor 1 into the reservoir vessel 2. In the configuration according to FIG. 1, a line 3 with valve control is provided for this purpose.

The reactor 1 is additionally connected to a first reservoir unit 8 in which, in the resting state of the apparatus, solid peroxodisulfate is present (as an example of a first reactant; alternatively, another substance suitable for preparation of chlorine dioxide may also be stored in the first reservoir unit). The reservoir unit 8 is connected via a line 7 to the reactor 1 such that liquid can be transferred from the reservoir unit 8 into the reactor 1.

Figure 2:
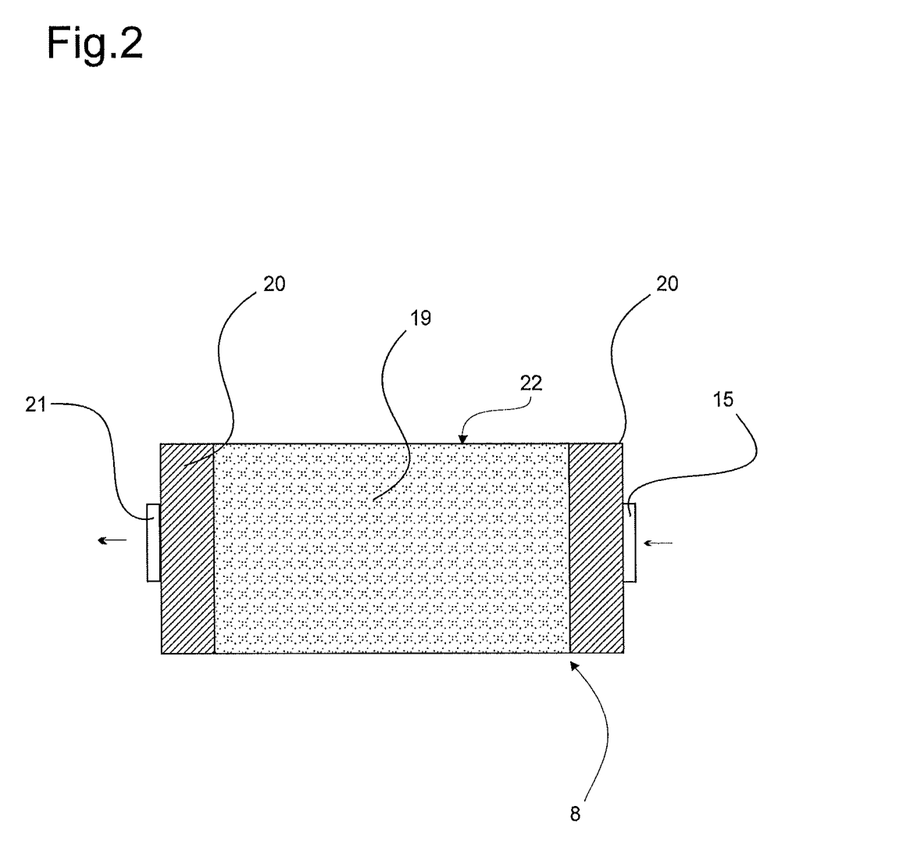
FIG. 2 a schematic diagram of a first reservoir unit for use as part of an inventive apparatus (as shown in FIG. 1 and the figures which follow) and for use in a process according to the invention.

The reservoir unit 8 comprises an inlet for water (cf. FIG. 2, reference numeral 15) and a separate outlet (assigned to the line 7) (cf. FIG. 2, reference numeral 21). The reservoir unit 8 comprises sodium peroxodisulfate in solid form. Line 7 takes the form of a pipeline and is an example of a means provided with preference in accordance with the invention for transferring liquid from the first reservoir unit 8 into the reactor 1.

The inlet of the reservoir unit 8 is connected via a feed 9 to a public water grid which serves as water reservoir. The reservoir unit 8 is disposed exchangeably between the feed 9 and the line 7 provided for discharge of liquid, the inlet being connected in a liquid-tight manner to the feed 9, such that a reliable connection of the first reservoir unit 8 to the water reservoir is assured (the water grid; the water grid, in terms of the chemical parameters, should provide water in drinking water quality; cf., with regard to the chemical parameters in this respect, the German drinking water regulations—TrinkwV 2001 and the list of processing materials and disinfection methods according to §11 Trinkwasserverordnung 2001 (16th amendment; issued: November 2011)). The exchangeable reservoir unit 8 comprises a housing in which the first reactant (in the example: peroxodisulfate) is disposed. The housing is preferably cylindrical, such a cylindrical housing preferably being arranged such that, in operation, water penetrates from the feed 9 through the inlet into the cylindrical housing and dissolves or at least suspends the peroxodisulfate therein, and the resulting aqueous solution or dispersion flows through the outlet toward reactor 1. The flow direction preferably runs along the longitudinal axis of the cylindrical housing, which substantially ensures that no residual to amounts of peroxodisulfate remain in the housing. The cylindrical housing is preferably manufactured from plastic, the plastic being inert to peroxodisulfate. The cylindrical housing is preferably manufactured from transparent plastic, such that the user can observe the housing interior and the processes that take place therein through the outer wall of the housing.

Additionally connected to the reactor 1 is a second reservoir unit 4 which, in the configuration according to FIG. 1, stores a chlorite solution but, according to the general details of the present invention, could also be filled with another reactant. Said chlorite solution can be transferred from the second reservoir unit 4 (thus, in the example, the chlorite reservoir vessel) via a line 5 with a pump into the reactor 1 such that only a defined amount of the chlorite solution passes into the reactor 1. The line 5 is an example of a means preferred in accordance with the invention for transferring liquid from the second reservoir unit 4 into the reactor 1. If the second reservoir unit 4 is arranged in a suitable manner, it is alternatively possible to dispense with the use of a pump in the line 5; in many cases, the provision of a valve or the like is then sufficient (cf. also the description relating to FIGS. 3, 4 and 5).

The reservoir vessel 2 is joined to a metering device 10 for metered withdrawal of aqueous chlorine dioxide solution from the reservoir vessel 2; the metering device 10 is preferably a pump, for example a peristaltic pump. Via the metering device 10, the reservoir vessel 2 is connected to a system 11 not shown in any detail, which is in need of disinfection with an aqueous chlorine dioxide solution.

The reservoir vessel 2 has an interior somewhat larger than the interior of the reactor 1. This allows the entire volume of aqueous chlorine dioxide solution produced in the reactor 1 to be transferred to the reservoir vessel 2, if the reservoir vessel 2 is empty or is filled with no more than a (reserve) stock of chlorine dioxide solution which, on the one hand, is still sufficient to provide chlorine dioxide solution for a sufficiently long period but, on the other hand, is sufficiently low that the remaining internal volume of the reservoir vessel 2 can accommodate the total volume of chlorine dioxide solution from the reactor 1.

The apparatus shown in FIG. 1 additionally comprises a ventilation and evacuation system 16 for the reservoir vessel 2 and the reactor 1. This ventilation and evacuation system 16 comprises activated carbon filters or similarly equipped filter units and lines to reservoir vessel 2 and reactor 1.

The reactor 1 is equipped with a thermostat-controllable heater 12 which, in operation, enables the establishment of a constant temperature of, for example, 30° C. in the reaction mixture. The thermostat-controllable heater 12 is an example of a device preferred in accordance with the invention for heating and/or cooling of the reactor 1. The thermostat-controllable heater 12 comprises or is connected to an open-loop or closed-loop control unit 13 for establishing a target temperature and/or maintaining a constant target temperature.

The feed 9, in the configuration according to FIG. 1, has an assigned device 14 for heating and/or cooling water, such that water which is to be supplied from the water grid through the line 9 to the first reservoir unit 8 can be heated or cooled in the device 14, such that it reaches the first reservoir unit 8 with a particular defined temperature. In operation, water is thus supplied via the feed 9 to the device 14, its temperature is adjusted therein (by heating or cooling) and it is then transported through the continuation of line 9 into the first reservoir unit 8.

The apparatus (plant) shown in FIG. 1 additionally comprises an open-loop and closed-loop control device 13, which is not shown in detail, for controlling relevant functions of the apparatus (plant). In the example according to FIG. 1, the open-loop and closed-loop control unit 13 serves to control the water flow to the first reservoir unit 8, to control the device 14 for heating and/or cooling water, which device is assigned to the feed 9, for controlling the thermostat-controllable heater 12 (as an example of a device for heating and/or cooling the reactor 1), for controlling the volume of liquid which is to be transferred from the second reservoir unit 4 into the reactor 1, for controlling the amount of aqueous chlorine dioxide solution which is to be transferred from the reactor 1 to the reservoir vessel 2, and for controlling the metering device 10 for metered withdrawal of aqueous chlorine dioxide solution from the reservoir vessel 2.

The apparatus (plant) according to FIG. 1 additionally comprises a barrier apparatus 17 for preventing or hindering liquids and/or gases from passing over from the reactor 1 into the first reservoir unit 8. The barrier apparatus 17 takes the form, for example, of a siphon or non-return valve. In the operation of the apparatus (plant) according to FIG. 1, the first reservoir unit 8 and the second reservoir unit 4 are filled with the respective reactant. In this context, the ratio of the molar amount of first reactant in the first reservoir unit to the volume of the reactor is chosen so as to rule out any risk of explosion in the event of proper operation of the apparatus (plant), and such that a chlorine dioxide solution usable directly for water treatment is attainable. See above for preferred ratios of the molar amount of peroxodisulfate as first reactant in the first reservoir unit 8 to the volume of the reactor 1.

Reactor 1 and/or reservoir vessel 2 comprise, in preferred configurations, a fill level measuring device 18 or 18', which interact with the open-loop and closed-loop control unit 13 and ensure that fill levels in reactor 1 and/or reservoir vessel 2 are not excessively high or low.

For preparation of an aqueous chlorine dioxide solution using the peroxodisulfate-chlorite system, the procedure is preferably as follows:

A defined amount of chlorite solution (e.g. 2 liters) is conveyed out of the second reservoir unit 4 via the pipeline 5 into the reactor 1. Water (e.g. 18 liters) is subsequently transported through the line 9 into the first reservoir unit 8 (the water having been heated by means of the device 14 to a target temperature of 30° C.). The water flows through the cylindrical housing of the first reservoir unit 8 and completely dissolves the salt present in the housing (for example a mixture of 134.2 g of sodium peroxodisulfate ($Na_2S_2O_8$) and 40 g of sodium hydrogensulfate ($NaHSO_4$)). For this purpose, the first reservoir unit is configured so as to result in a turbulent flow (Reynolds number >3600). The resulting solution is introduced via the line 7 into the reactor 1 and mixed with the chlorite solution initially charged therein. The inflow of the solution into the reactor 1 here is preferably tangential, so as to result in optimal mixing and hence in formation of a homogeneous aqueous reaction mixture. The internal reactor temperature is set to a reaction temperature in the range of 20° C.-40° C., preferably to a temperature of about 30° C., by means of the heater 12 which is under open-loop or closed-loop control or is thermostat-controllable. The heater 12 is controlled by means of the open-loop and closed-loop control unit 13. In the reactor 1, the reaction then takes place to form chlorine dioxide from peroxodisulfate and chlorite. The reaction conditions are adjusted, for example, as disclosed in patent specification EP 822920 B1. The reaction time is, for example, 24 hours.

After the reaction has ended, a chlorine dioxide-containing solution usable for water treatment (e.g. 20 liters) is present. This solution is transferred from the reactor 1 through the line 3 into the reservoir vessel 2, for which purpose the valve provided in the line 3 is actuated. From the reservoir vessel 2, the aqueous chlorine dioxide solution prepared is supplied by means of the metering device 10 to the system 11 not shown in any detail in FIG. 1, which is in need of treatment with chlorine dioxide.

In the process outlined, the open-loop and closed-loop control unit 13 controls the water flow to the first reservoir unit 8 (from the water grid through the line 9) and the control of the device 14 assigned to the feed 9, and the control of the thermostat-controllable heater 12 for heating and/or cooling of the reactor 1 and the metering of the volume of chlorite solution which is transferred from the second reservoir unit 4 into the reactor 1 and the control of the volume of aqueous chlorine dioxide solution which is transferred from the reactor 1 (after actuation of the valve in the line 3) to the reservoir vessel 2 and the control of the metering device 10 for metered withdrawal of aqueous chlorine dioxide solution from the reservoir vessel 2 and for supply of this aqueous chlorine dioxide solution to the system 11.

Once the volume of first reactant (in the example: peroxodisulfate salt) initially stored in the first reservoir unit 8 has been purged completely from the first reservoir unit 8, the first reservoir unit 8 is replaced. For this purpose, the liquid-tight connection between the first reservoir unit 8 and the feed 9 arranged on the feed side is broken, as is the liquid-tight connection to the line 7 on the outflow side. The first reservoir unit 8 is preferably equipped with quick-fit pipe connections; cf. the details given above. The spent first reservoir unit 8 is replaced by a fresh (replacement) reservoir unit containing a volume of peroxodisulfate as required in a subsequent reaction. Typically, the molar amounts of peroxodisulfate used in (replacement) reservoir units are identical in each case. The (replacement) reservoir unit is connected liquid-tight to the feed 9 and the line 7 by means of said quick-fit connections and is then available for a subsequent chlorine dioxide preparation.

In particularly preferred configurations, a first magazine is provided, which accommodates two or more replacement reservoir units for the first reservoir unit 8.

FIG. 2 is a schematic diagram of a first reservoir unit 8 for use as part of an inventive apparatus (as shown in FIG. 1 and the figures which follow) and for use in a process according to the invention.

The first reservoir unit 8 comprises an inlet 15 for water, which can be connected liquid-tight by means of a quick-fit connection, not shown in any detail, to the feed 9 according to FIG. 1. In addition, the first reservoir unit 8 comprises an outlet 21 which can be connected liquid-tight by means of a quick-fit connection not shown in any detail to the line 7 according to FIG. 1. The first reservoir unit 8 comprises a cylindrical housing 22 which defines a housing interior 19 within which a first reactant (in the configuration according to FIG. 1: peroxodisulfate in a mixture with sodium hydrogensulfate) is present. To counter premature exit of first reactant through inlet 15 or outlet 21, retaining means 20 are respectively arranged, which may in practice be spatially fixed wadding filters or the like. The cylindrical housing 22 is manufactured from transparent plastic, the plastic being inert to peroxodisulfate; the user can observe the housing interior and the processes that take place therein through the outer wall of the housing.

Figure 3:
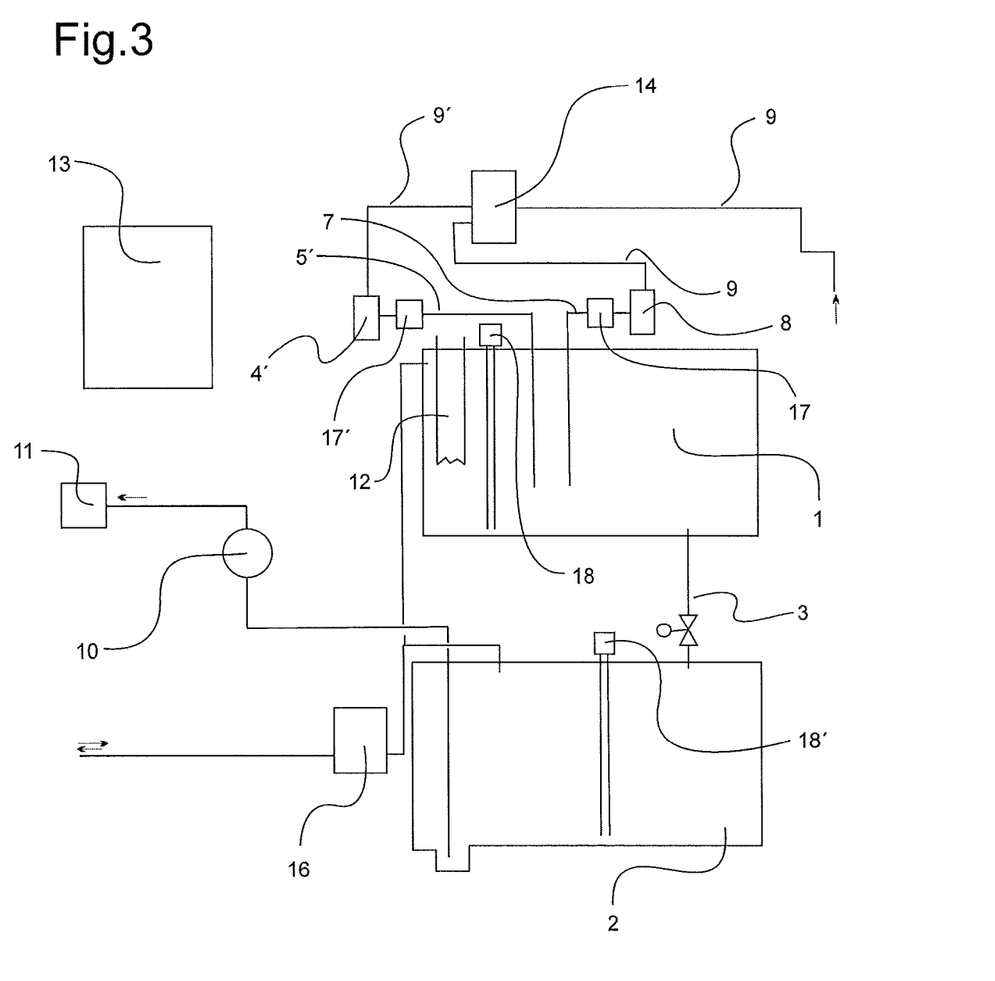
FIG. 3 a schematic diagram of an inventive apparatus corresponding substantially, but not completely, to that from FIG. 1.

FIG. 3 shows an inventive apparatus corresponding substantially but not completely to that from FIG. 1. Elements of the apparatus according to FIG. 3 that correspond to elements from the apparatus according to FIG. 1 in a technically unchanged manner are indicated by identical reference numerals. Elements of the apparatus according to FIG. 3 which correspond to elements from the FIG. 1 apparatus in functional terms without being identical are identified by identical reference numerals with a superscripted prime.

The apparatus according to FIG. 3 comprises a reactor 1 and a first reservoir unit 8, the arrangement of which and the connection of which are identical to one another in comparison to FIG. 1. The same applies to the arrangement of the reservoir vessel 2.

In contrast to FIG. 1, the apparatus according to FIG. 3, however, comprises a second reservoir unit 4' constructed and arranged in a corresponding manner to the first reservoir unit 8. The second reservoir unit 4' therefore comprises the second reactant and has an inlet for water and a separate outlet, the second reservoir unit 4' being exchangeable. Preferably, the second reactant in the second reservoir unit 4' is in solid form. Thus, if (analogously to the configuration in FIG. 1) the first reservoir unit 8 comprises the first peroxodisulfate reactant (in a mixture of its sodium salt with sodium hydrogensulfate), the second reservoir unit 4' according to FIG. 3 comprises the second chlorite reactant, preferably in solid form, i.e. as a salt. It is customary to use it in the form of the sodium salt. The second reservoir unit 4' is connected via a line 5' to the reactor 1 and via a line 9' to the water reservoir (water grid), it being possible to heat and/or cool the line 9' by means of the device 14 which is already responsible for heating and/or cooling of the line 9. Alternatively, a separate (second) device for heating and/or cooling may be provided, assigned exclusively to the line 9'. On the water reservoir side, the line 9' is combined with the line 9.

Between the second reservoir unit 4' and the reactor 1, the line 5' is protected by means of a second barrier apparatus 17' which is provided to prevent or hinder liquids and/or gases from passing over from the reactor 1 into the second reservoir unit 4'.

In the operation of the apparatus according to FIG. 3, the procedure is analogous to the procedure according to FIG. 1, except that, of course, in accordance with the apparatus differences in the particular apparatuses, the second reactant is also purged out of its second reservoir unit 4'. With regard to the purging operation, reference is made to the corresponding details given for FIG. 1 (relating to the purging out of the first reservoir unit 8 therein); the details given apply correspondingly. The sequence of the purging steps can be selected freely, although it is still preferable first to prepare a chlorite solution and purge it into the reactor 1 and only then to add a peroxodisulfate solution in the reactor 1.

Figure 4:
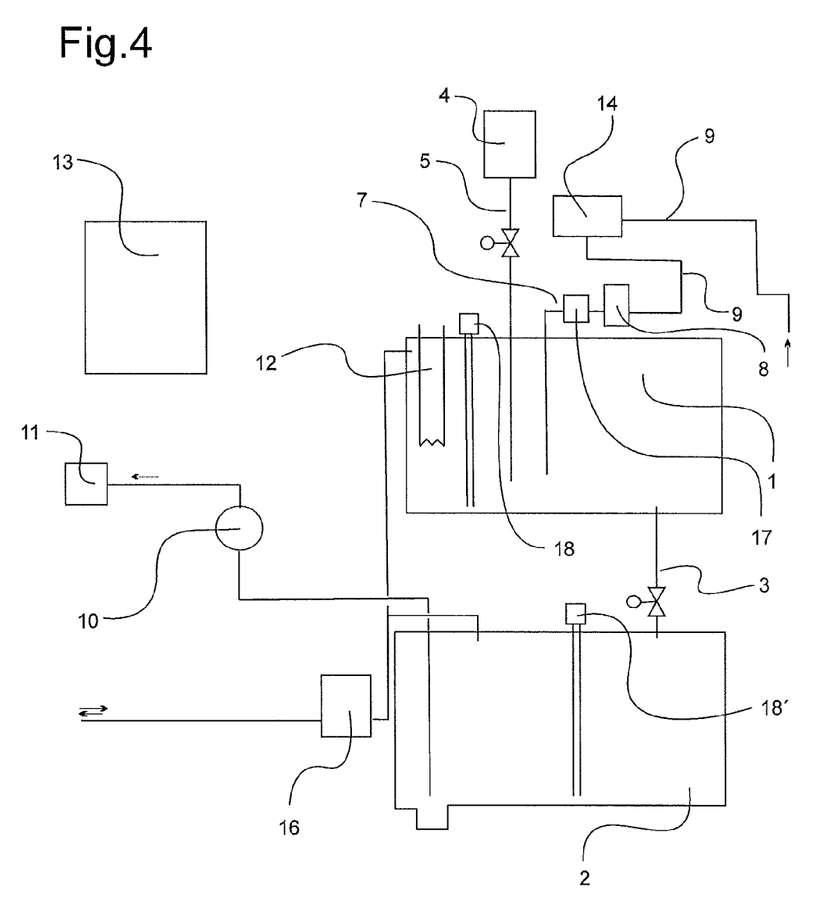
FIG. 4 a schematic diagram of an inventive apparatus differing from the apparatus according to FIG. 1 merely in the arrangement and configuration of the second reservoir unit and of the means for transferring liquid from the second reservoir unit to the reactor.

FIG. 4 shows, in schematic form, the construction of an apparatus which differs from the apparatus according to FIG. 1 merely in terms of arrangement and configuration of the second reservoir unit 4 and of the means 5 for transferring liquid from the second reservoir unit 4 into the reactor 1. In the configuration according to FIG. 4, the second reservoir unit 4 comprises the second reactant preferably in the form of a liquid solution, more preferably in the form of an aqueous solution. In this case, the second reservoir unit 4 is arranged above the reactor 1 such that a or the aqueous solution of the second reactant can be transferred from the second reservoir unit 4 by means of gravity into the reactor 1. The configuration therefore corresponds, in technical terms, to the configuration of the liquid transport from the reactor 1 into the reservoir vessel 2. The corresponding details given for FIG. 1 apply correspondingly in this respect. More particularly, in the configuration according to FIG. 4, the line 5 is equipped with a valve which permits controlled supply of the solution of the second reactant (chlorite) into the reactor 1. The valve is partly monitored by the open-loop and closed-loop control unit 13.

Figure 5:
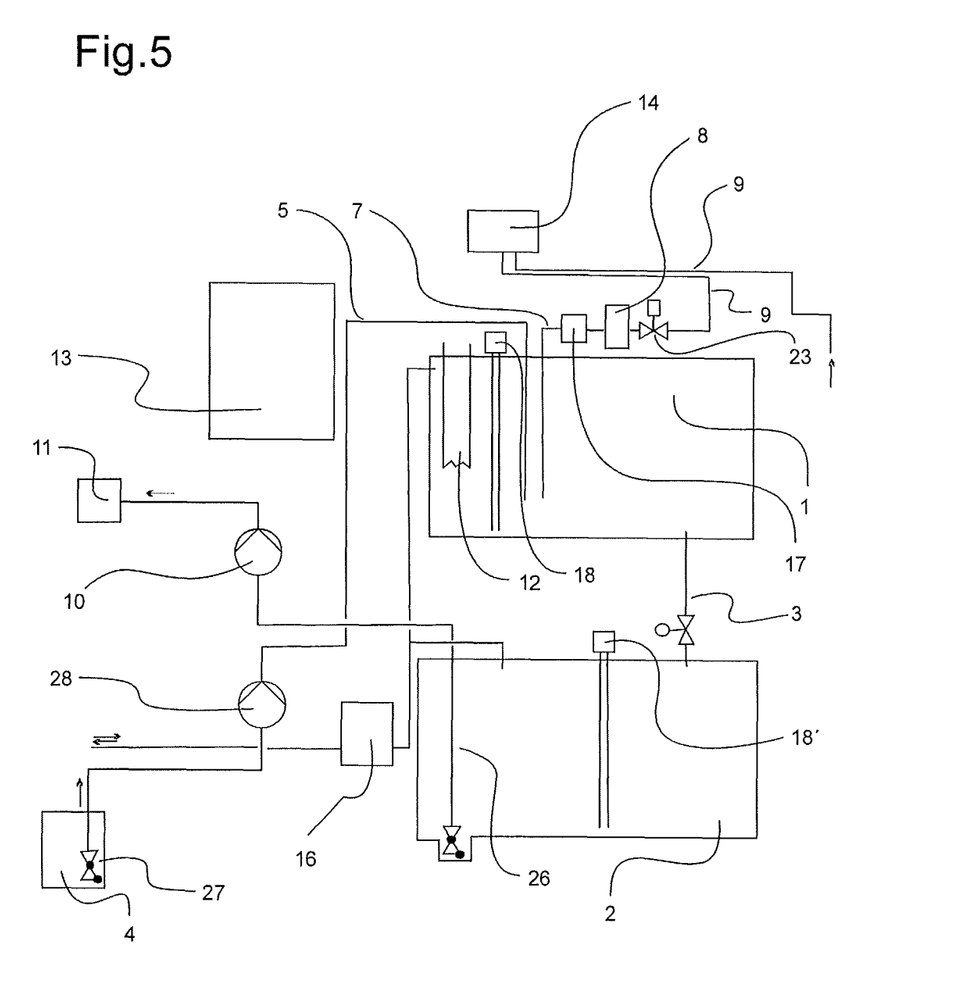
FIG. 5 a schematic drawing of a specific configuration of an inventive apparatus (plant) according to FIG. 1 for preparation of aqueous chlorine dioxide solutions.

FIG. 5 is a schematic drawing of a specific configuration of an inventive apparatus (plant) for preparation of aqueous chlorine dioxide solutions according to FIG. 1. Elements of the apparatus according to FIG. 5 which correspond at least substantially in functional terms to elements from the apparatus according to FIG. 1 are indicated by identical reference numerals.

To start up the apparatus (plant) shown schematically in FIG. 5, it is connected via a feed 9 to a water grid (for example a public water grid) which serves as water reservoir. Only a cold water connection is required. The apparatus is likewise connected to a power grid. A supply voltage of 230 V with a frequency of 50 Hz is required.

A complete startup comprises the following steps:
insert reservoir unit 8 comprising a mixture of sodium peroxodisulfate and sodium hydrogensulfate (see above), close quick-fit connections;
ventilation and evacuation system 16 automatically starts to suck out any chlorine dioxide gases that have penetrated through the water reservoir, and stops automatically as soon as quick-fit connections have been closed and the plant is thus closed again with sufficient gastightness;
confirm with the open-loop and closed-loop control unit 13 that a fresh (replacement) reservoir unit 8 has been inserted;
a peristaltic pump 28 starts to pump chlorite solution from the reservoir unit 4 by means of a suction probe with a base valve 27 via the line 5 into the previously empty reactor 1. The fill level in the reactor 1 is detected by a fill level probe 18 and controlled by the open-loop and closed-loop control unit 13.

As soon as a fill level of 2 liters of chlorite solution in the reactor 1 is attained, the peristaltic pump 28 stops;
magnetic valve 23 is opened and water (from a water reservoir) is heated by a flow heater 14 to more than 30° C. and flows through the reservoir unit 8. The mixture of sodium peroxodisulfate and sodium hydrogensulfate, which reacts endothermically, has very good solubility in warm water and is purged into the reaction vessel until a total fill level of 20 liters has been attained therein. The open-loop and closed-loop control unit 13 then causes the magnetic valve 23 to be closed.

A heating rod with a glass cylinder and thermostat 12 begins to heat the reactor interior.

Any chlorine dioxide gas displaced by the liquid entering the reactor 1 is filtered by a ventilation and evacuation system 16 which is connected both to reactor 1 and reservoir vessel 2 and comprises an activated carbon filling, such that impairment of the ambient air is prevented. The activated carbon reduces the chlorine dioxide here.

A timer in the open-loop and closed-loop control unit 13 begins to count down 24 hours.

The heating rod with glass cylinder and thermostat 12, under the control of the open-loop and closed-loop control unit 13, keeps the chlorine dioxide-containing reaction mixture at a temperature of 30° C.

After a maturing phase of 24 hours at at least 30° C., an electrical ball valve in the line 3 between reactor 1 and reservoir vessel 2 opens automatically and releases the finished chlorine dioxide solution into the reservoir vessel 2.

It is then possible to use a magnetic membrane pump 10 to withdraw the finished chlorine dioxide solution from the reservoir vessel 2 with a suction probe having a base valve 26 and meter it into the system 11 not shown in any detail, which is in need of disinfection with an aqueous chlorine dioxide solution.

Should a leak occur anywhere in the generator system or the peristaltic pump and liquid escape, it is captured by a collecting bath (not shown in detail) for droplet volumes. This collecting bath is monitored with an electrical two-rod probe which completely switches off the whole system on activation; an alarm lamp begins to flash in this case.

A batch preparation process in the course of operation may comprise the following steps, by way of example:
After startup, the reservoir vessel 2 is filled with 20 liters of finished chlorine dioxide solution and the reactor 1 is empty.

A magnetic membrane pump 10 withdraws chlorine dioxide solution from the reservoir vessel 2.

From then on, a fresh (replacement) reservoir unit 8 can be inserted and the insertion can be confirmed with the open-loop and closed-loop control unit 13.

On the open-loop and closed-loop control unit 13, a minimum amount in liters of chlorine dioxide solution that has to be present in stock in the reservoir vessel 2 is set (report level); if the amount goes below the minimum, new chlorine dioxide solution should be made up in order to assure continuous metered addition. The report level should be chosen at a sufficiently high level that the residual amount in the reservoir vessel 2 lasts out for at least until new chlorine dioxide solution has matured ready for operation; the report level should thus be chosen at a sufficiently high level that the residual amount in the reservoir vessel 2 lasts out for at least 24 hours.

The contents of the reservoir vessel 2 are constantly monitored by the open-loop and closed-loop control unit 13 via a fill level probe 18.

If the volume goes below the report level volume, i.e. as soon as a sufficiently large reserve of chlorine dioxide solution for at least 24 hours of operation is no longer available, the open-loop and closed-loop control unit 13 triggers the batch preparation of a new chlorine dioxide solution in the reactor 1, if a reservoir unit 8 has been inserted and this operation has been confirmed.

Should no new reservoir unit 8 have been inserted and confirmed by this time, a warning light starts to flash and thus indicates that a new reservoir unit 8 has to be inserted.

When the reservoir unit 8 has been inserted, the peristaltic pump 28 starts to pump chlorite solution into the empty reactor 1. The fill level in reactor 1 and reservoir vessel 2 is detected by fill level probes 18, 18' and is monitored by means of the open-loop and closed-loop control unit 13.

As soon as 2 liters of chlorite solution have been pumped into the reactor 1, the peristaltic pump 28 stops, triggered by the open-loop and closed-loop control unit 13.

Magnetic valve 23 is opened and water (from a water reservoir) is heated by a flow heater 14 to more than 30° C. and flows through the reservoir unit 8. The mixture of sodium peroxodisulfate and sodium hydrogensulfate, which reacts endothermically, has very good solubility in warm water and is purged into the reaction vessel until a total fill level of 20 liters has been attained therein. The open-loop and closed-loop control unit 13 then causes the magnetic valve 23 to be closed.

A heating rod with a glass cylinder and thermostat 12 begins to heat the reactor interior.

A timer in the open-loop and closed-loop control unit 13 begins to count down 24 hours.

The heating rod with glass cylinder and thermostat 12, under the control of the open-loop and closed-loop control unit 13, keeps the chlorine dioxide-containing reaction mixture at a temperature of 30° C.

In the open-loop and closed-loop control unit 13, a value for the reserve stock of, for example, 1 liter for the reservoir vessel 2 is defined. If the 24-hour maturing phase is exceeded and the level goes below the value for the reserve stock, an electrical ball valve in the line 3 between reactor 1 and reservoir vessel 2 opens automatically and releases the finished chlorine dioxide solution into the reservoir vessel 2.

It is then possible to use a magnetic membrane pump 10 to meter the finished chlorine dioxide solution into the system 11 (not shown in any detail), which is in need of disinfection with an aqueous chlorine dioxide solution.

Two use examples are reported hereinafter, each of which relates to the preparation of aqueous chlorine dioxide solutions in an inventive apparatus.

Use Example 1: Preparation of an aqueous chlorine dioxide solution by the peroxodisulfate-chlorite process (first reservoir unit comprises chlorite in solid form):

7.9 liters of a solution which contains 20 g of $Na_2S_2O_8/L$ and is buffered within the pH range between 6 and 7 by a carbonate buffer or a phosphate buffer are initially charged in the reactor. In a first reservoir unit are 100 g of a commercial sodium chlorite salt (80% sodium chlorite, 20% sodium chloride), which are dissolved in the reservoir unit by means of 12.1 liters of heated water and are mixed with the sodium peroxodisulfate solution in the reactor by means of tangential inflow. In the reactor, a temperature of 30° C. is established for 24 hours. It should be taken into account that lower reaction temperatures require longer reaction times for a virtually complete conversion of the chlorite to chlorine dioxide (e.g. 20° C.; reaction time of 120 hours). After the reaction time, the chlorine-containing chlorine dioxide solution is transferred into a reservoir vessel. The reactor is subsequently available for a new preparation batch.

Before being transferred into the reactor, the sodium peroxodisulfate solution was present in a second reservoir unit. The first reservoir unit is configured in the inventive manner (inflow for water; separate outlet; exchangeable).

Use Example 2: Preparation of an aqueous chlorine dioxide solution by the peroxodisulfate-chlorite process (first reservoir unit comprises sodium peroxodisulfate in solid form):

2.0 liters of an alkaline solution (pH 11.5) which contains 30 g of $ClO_2^-/L$ and is buffered by a carbonate or a phosphate within the pH range between 6 and 7 after addition of the acidic sodium peroxodisulfate component are initially charged in the reactor. In a first reservoir unit are 140 g of sodium peroxodisulfate salt, which are dissolved in the reservoir unit by 18.0 liters of heated water and are mixed with the sodium chlorite solution in the reactor by means of tangential inflow. In the reactor, a temperature of 30° C. is established for 24 hours. It should be taken into account that lower reaction temperatures require longer reaction times for a virtually complete conversion of the chlorite to chlorine dioxide (e.g. 20° C.; reaction time of 120 hours). After the reaction time, the chlorine-free chlorine dioxide solution is transferred into a reservoir vessel. The reactor is subsequently available for a new preparation batch.

Before being transferred into the reactor, the alkaline chlorite solution ($ClO_2^-$) was present in a second reservoir unit. The first reservoir unit is configured in the inventive manner (inflow for water; separate outlet; exchangeable).

Use Example 3: Preparation of an aqueous chlorine dioxide solution by the sodium chlorite-hydrochloric acid process (first reservoir unit comprises chlorite in solid form):

3 liters of a 10% by weight hydrochloric acid solution are initially charged in the reactor. In the first reservoir unit are 100 g of a commercial sodium chlorite salt (80% sodium chlorite, 20% sodium chloride), which are dissolved in the first reservoir unit by means of 17 liters of water and mixed with the hydrochloric acid solution in the reactor by means of tangential outflow. A virtually complete conversion of the chlorite to chlorine dioxide has been attained after 2 hours. After the reaction time, the chlorine dioxide solution containing about 3 g of chlorine dioxide/L is transferred to a reservoir vessel. The reactor is subsequently available for a new preparation batch.

Before being transferred into the reactor, the 10% by weight hydrochloric acid solution was present in a second reservoir unit. The first reservoir unit is configured in the inventive manner (inflow for water; separate outlet; exchangeable).

Use Example 4: Preparation of an aqueous chlorine dioxide solution by the chlorine solution: chlorite solution process (for chemism see: White, G. C.; Handbook of CHLORINATION and alternative Disinfectants; John Wiley & Sons, Inc., Weinheim, 1999; p. 1162) (first reservoir unit comprises chlorite and hypochlorite in solid form):

1 liter of a 37% by weight hydrochloric acid solution is initially charged in the reactor. In the first reservoir unit are 100 g of a commercial sodium chlorite salt (80% sodium chlorite, 20% sodium chloride) and 32 g of calcium hypochlorite ($Ca(ClO)_2$) mixed with the commercial sodium chlorite salt. This mixture is dissolved in the first reservoir unit by means of 17 liters of water and mixed with the hydrochloric acid solution in the reactor by means of tangential outflow. A virtually complete reaction of the chlorite with the hypochlorous acid that forms in the reactor to give chlorine dioxide has been attained after 15 minutes, After the reaction time, the chlorine dioxide solution containing about 3 g of chlorine dioxide/L is transferred to a reservoir vessel. The reactor is subsequently available for a new preparation batch.

Before being transferred into the reactor, the 37% by weight hydrochloric acid solution was present in a second reservoir unit. The first reservoir unit is configured in the inventive manner (inflow for water; separate outlet; exchangeable).

Use Example 5: Preparation of an aqueous chlorine dioxide solution by the sodium chlorite solution-sulfuric acid process (for chemism see: Böhmländer, F.; Entwicklung von Chlordioxyd aus Natriumchlorit-Lösung mit Hilfe von Schwefelsäure; from Wasser 29 (78) 1962, p. 78-97) (first reservoir unit comprises chlorite in solid form):

1 liter of a 60% by weight sulfuric acid solution is initially charged in the reactor. In the first reservoir unit are 120 g of a commercial sodium chlorite salt (80% sodium chlorite, 20% sodium chloride) and 40 g of sodium chloride (NaCl) mixed with the commercial sodium chlorite salt. This mixture is dissolved in the first reservoir unit by means of 19 liters of water and mixed with the sulfuric acid solution in the reactor by means of tangential outflow. A virtually complete conversion of the chlorite to chlorine dioxide has been obtained after 2 hours. After the reaction time, the chlorine dioxide solution containing about 3 g of chlorine dioxide/L is transferred to a reservoir vessel. The reactor is subsequently available for a new preparation batch.

Before being transferred into the reactor, the 60% by weight sulfuric acid solution was present in a second reservoir unit. The first reservoir unit is configured in the inventive manner (inflow for water; separate outlet; exchangeable).

Use Example 6: Preparation of an aqueous chlorine dioxide solution by the sodium chlorite solution-sulfuric acid process (for chemism see: Böhmländer, F.; Entwicklung von Chlordioxyd aus Natriumchlorit-Lösung mit Hilfe von Schwefelsäure; from Wasser 29 (78) 1962, p. 78-97) (first reservoir unit comprises sodium hydrogensulfate in solid form):

2.0 liters of an aqueous alkaline solution (pH 11.5) containing 30 g of $ClO_2^-$/L are initially charged in the reactor. In the first reservoir unit are 800 g of the acidic salt of the sulfuric acid (sodium hydrogensulfate) in a mixture with 100 g of sodium chloride. This mixture is dissolved in the first reservoir unit by means of 18 liters of water and mixed with the chlorite solution in the reactor by means of tangential outflow. A virtually complete stoichiometric conversion of the chlorite to chlorine dioxide has been obtained after 2 hours. After the reaction time, the chlorine dioxide solution containing about 3 g of chlorine dioxide/L is transferred to a reservoir vessel. The reactor is subsequently available for a new preparation batch.

Before being transferred into the reactor, the aqueous alkaline solution containing 30 g of $ClO_2^-$/L was present in a second reservoir unit. The first reservoir unit is configured in the inventive manner (inflow for water; separate outlet; exchangeable).

Use Example 7: Preparation of an aqueous chlorine dioxide solution by the sodium chlorite solution-sulfuric acid process (for chemism see: Böhmländer, F.; Entwicklung von Chlordioxyd aus Natriumchlorit-Lösung mit Hilfe von Schwefelsäure; from Wasser 29 (78) 1962, p. 78-97) (second reservoir unit comprises sodium hydrogensulfate in solid form, first reservoir unit contains commercial sodium chlorite (80% $NaClO_2$ and 20% NaCl) in solid form):

In the second reservoir unit are 800 g of the acidic salt of the sulfuric acid (sodium hydrogensulfate), which are dissolved in the second reservoir unit by means of 10 liters of heated drinking water and passed into the reactor. In the first reservoir unit are 800 g of a commercial sodium chlorite-sodium chloride mixture. The latter is subsequently mixed with the aqueous hydrogensulfate solution by means of 10 liters of drinking water and by means of tangential outflow in the reactor. A virtually complete stoichiometric conversion of the chlorite to chlorine dioxide has been attained after 2 hours. After the reaction time, the chlorine dioxide solution containing about 4.5 g of chlorine dioxide/L is transferred to a reservoir vessel. The reactor is subsequently available for a new preparation batch.

Before being transferred into the reactor, the 800 g of sodium hydrogensulfate were present in a second reservoir unit corresponding in terms of its embodiment to the first reservoir unit. The first reservoir unit is configured in the inventive manner (inflow for water; separate outlet; exchangeable).

The invention claimed is:

1. An apparatus for preparing aqueous chlorine dioxide solutions, comprising
   (a) a reactor (1),
   (b) a first reservoir unit (8),
      comprising a first reactant for preparation of chlorine dioxide, the first reactant being in solid form,
      having an inlet (15) for water and a separate outlet (21),
      the first reservoir unit (8) being exchangeable,
   (c) a second reservoir unit (4) for storing a second reactant for preparation of chlorine dioxide.

2. The apparatus as claimed in claim 1, wherein the first reactant in the first reservoir unit (8) is selected from the group consisting of peroxodisulfate and chlorite.

3. The apparatus as claimed in claim 1 for preparation of aqueous chlorine dioxide solutions usable directly for water treatment.

4. The apparatus as claimed in claim 1, further comprising
   (d) a feed (9) connected liquid-tight to the inlet (15) for water, for connection of the first reservoir unit (8) to a water reservoir,
   and optionally
   (e) a device (14) for heating and/or cooling water, the relationship of the device (14) to the feed (9) being such that
      water heated or cooled by the device (14) is fed via the feed (9) to the first reservoir unit (8)
      and/or
      water is fed via the feed (9) to the device (14).

5. The apparatus as claimed in claim 1, further comprising
   (f) means (7) for transferring liquid from the first reservoir unit (8) into the reactor (1),
   and/or
   (g) means (5) for transferring liquid from the second reservoir unit (4) into the reactor (1).

6. The apparatus as claimed in claim 1, further comprising
(h) a reservoir vessel (2) for accommodating aqueous chlorine dioxide solution from the reactor (1),
and optionally comprising
(i) a metering device (10) for metered withdrawal of aqueous chlorine dioxide solution from the reservoir vessel (2).

7. The apparatus as claimed in claim 1, wherein the first reactant in the first reservoir unit (8) is peroxodisulfate and the ratio of the molar amount of peroxodisulfate in the first reservoir unit (8) to the volume of the reactor (1) is less than or equal to 0.148 mol/liter,
or
wherein the first reactant in the first reservoir unit (8) is chlorite and the ratio of the molar amount of chlorite in the first reservoir unit (8) to the volume of the reactor (1) is less than or equal to 0.296 mol/liter.

8. The apparatus as claimed in claim 1, further comprising
(j) a device (12) for heating and/or cooling the reactor (1),
and/or
(k) a barrier apparatus (17) for preventing or hindering liquids and/or gases from passing over from the reactor (1) into the first reservoir unit (8).

9. The apparatus as claimed in claim 1, further comprising
(l) an open-loop and closed-loop control unit (13) for controlling
the water flow to the first reservoir unit (8)
and/or
the device (14) for heating and/or cooling water, which device is related to the feed (9),
and/or
the device (12) for heating and/or cooling the reactor (1)
and/or
the liquid volume to be transferred from the second reservoir unit (4) to the reactor (1)
and/or
the volume of aqueous chlorine dioxide solution to be transferred from the reactor (1) to the reservoir vessel (2)
and/or
the metering device (10) for metered withdrawal of aqueous chlorine dioxide solution from the reservoir vessel (2).

10. The apparatus as claimed in claim 1, wherein
the second reservoir unit (4) comprises the second reactant,
and/or
the second reservoir unit (4) is arranged above the reactor (1) such that a or the aqueous solution of the second reactant can be transferred from the second reservoir unit (4) by means of gravity into the reactor (1).

11. The apparatus as claimed in claim 1, wherein
the second reservoir unit (4') comprises the second reactant and has an inlet (15) for water and a separate outlet (21), the second reservoir unit (4') being exchangeable and the second reactant in the second reservoir unit (4').

12. The apparatus as claimed in claim 1, further comprising a first magazine for accommodating one, two or more replacement reservoir units for the first reservoir unit (8).

13. The apparatus as claimed in claim 3, wherein the aqueous chlorine dioxide is prepared by a peroxodisulfate-chlorite process or a sodium chlorite-hydrochloric acid process.

14. The apparatus as claimed in claim 6, wherein the reservoir vessel (2) is disposed beneath the reactor (1) such that aqueous chlorine dioxide solution can be transferred by means of gravity from the reactor (1) to the reservoir vessel (2).

15. The apparatus as claimed in claim 7, wherein the first reactant in the first reservoir unit (8) is peroxodisulfate and the ratio of the molar amount of peroxodisulfate in the first reservoir unit (8) to the volume of the reactor (1) is in the range from 0.00148 mmol/liter to 0.037 mol/liter,
or
wherein the first reactant in the first reservoir unit (8) is chlorite and the ratio of the molar amount of chlorite in the first reservoir unit (8) to the volume of the reactor (1) is in the range from 0.00296 mmol/liter to 0.074 mol/liter.

16. The apparatus as claimed in claim 8, wherein the device comprises an open-loop or closed-loop control unit for establishing a target temperature and/or maintaining a constant target temperature.

* * * * *